US010875119B2

(12) United States Patent
Chergui et al.

(10) Patent No.: US 10,875,119 B2
(45) Date of Patent: Dec. 29, 2020

(54) WELDING ELECTRODE, METHOD, AND DEVICE FOR WELDING SANDWICH PANELS

(71) Applicants: THYSSENKRUPP STEEL EUROPE AG, Duisburg (DE); thyssenkrupp AG, Essen (DE)

(72) Inventors: Azeddine Chergui, Dortmund (DE); Jovan Berak, Düsseldorf (DE)

(73) Assignees: THYSSENKRUPP STEEL EUROPE AG, Duisburg (DE); thyssenkrupp AG, Essen (DE)

( * ) Notice: Subject to any disclaimer, the term of this patent is extended or adjusted under 35 U.S.C. 154(b) by 576 days.

(21) Appl. No.: 15/542,968

(22) PCT Filed: Nov. 16, 2015

(86) PCT No.: PCT/EP2015/076656

§ 371 (c)(1),
(2) Date: Jul. 12, 2017

(87) PCT Pub. No.: WO2016/113019

PCT Pub. Date: Jul. 21, 2016

(65) Prior Publication Data

US 2018/0001415 A1 Jan. 4, 2018

(30) Foreign Application Priority Data

Jan. 14, 2015 (DE) ........................ 10 2015 100 496

(51) Int. Cl.
*B23K 11/30* (2006.01)
*B23K 11/00* (2006.01)
(Continued)

(52) U.S. Cl.
CPC ........ *B23K 11/3009* (2013.01); *B23K 11/002* (2013.01); *B23K 11/115* (2013.01);
(Continued)

(58) Field of Classification Search
CPC .......................... B23K 11/3009; B23K 11/115
(Continued)

(56) References Cited

U.S. PATENT DOCUMENTS 3,908,740 A * 9/1975 Schenk, Jr. ........ B23K 11/0006 164/80
3,909,581 A 9/1975 Stone et al.
(Continued)

FOREIGN PATENT DOCUMENTS

CN 1806993 A * 7/2006
DE 2733256 A1 2/1978
(Continued)

OTHER PUBLICATIONS

English translation of International Search Report issued in PCT/EP2015/076656, dated Apr. 5, 2016 (dated Apr. 13, 2016).
(Continued)

*Primary Examiner* — Christopher M Koehler
*Assistant Examiner* — Spencer H. Kirkwood
(74) *Attorney, Agent, or Firm* — Avant Law Group, LLC

(57) ABSTRACT

A welding electrode may comprise a welding electrode body and a welding electrode cap that is connected or connectable to the welding electrode body for making contact between the welding electrode and a component for producing a welded connection. The problem of achieving an efficient heating of the sandwich sheet to be welded in a compact layout with the fewest possible modifications of the welding electrodes used heretofore is solved in that an electrically conductive resistance element integrated, or which can be integrated, in the welding electrode and which is connected or connectable in an electrically-conductive manner to the welding electrode body and the welding electrode cap is
(Continued)

provided for the heating of the component. Furthermore, a method and a device with the welding electrode and a use are disclosed.

14 Claims, 4 Drawing Sheets

(51) Int. Cl.

| | |
|---|---|
| ***B23K 11/11*** | (2006.01) |
| ***B23K 11/16*** | (2006.01) |
| ***B23K 11/24*** | (2006.01) |
| ***B23K 35/02*** | (2006.01) |
| ***B23K 11/34*** | (2006.01) |
| *B23K 103/16* | (2006.01) |

(52) U.S. Cl.
CPC .............. *B23K 11/16* (2013.01); *B23K 11/24* (2013.01); *B23K 11/3018* (2013.01); *B23K 11/34* (2013.01); *B23K 35/0205* (2013.01); *B23K 2103/172* (2018.08)

(58) Field of Classification Search
USPC ........................................................ 219/91.1
See application file for complete search history.

(56) References Cited

U.S. PATENT DOCUMENTS

| | | | | |
|---|---|---|---|---|
| 4,650,951 A | 3/1987 | Koga | | |
| 5,021,627 A * | 6/1991 | Bersch | B23K 11/3009 | 219/119 |
| 10,384,297 B2 * | 8/2019 | Voigt | B23K 9/201 | |
| 2009/0266798 A1 | 10/2009 | Yang | | |
| 2013/0092435 A1 * | 4/2013 | Spencer | B23K 11/14 | 174/74 A |
| 2014/0286699 A1 | 9/2014 | Mizrahi | | |

FOREIGN PATENT DOCUMENTS

| | | | |
|---|---|---|---|
| DE | 4038016 | A | 6/1992 |
| DE | 102011109708 | A | 2/2013 |
| DE | 102012106521 | A | 1/2014 |
| DE | 102014208708 | A | 11/2015 |
| EP | 0383060 | A | 8/1990 |
| FR | 1535578 | A | 8/1968 |
| GB | 775428 | | 5/1957 |
| JP | S5315239 | A | 2/1978 |
| JP | S55109583 | A | 8/1980 |
| JP | S5985384 | A | 5/1984 |
| JP | S60068180 | A | 4/1985 |
| JP | 03000481 | A | 1/1991 |
| JP | H0560678 | U | 8/1993 |
| JP | H06292982 | A | 10/1994 |
| JP | H0768387 | A | 3/1995 |
| JP | H11104846 | A | 4/1999 |
| JP | 2006305591 | A | 11/2006 |

OTHER PUBLICATIONS

English abstract of DE102011109708A.
English abstract of DE102014208708A.

* cited by examiner

WELDING ELECTRODE, METHOD, AND DEVICE FOR WELDING SANDWICH PANELS

CROSS REFERENCE TO RELATED APPLICATIONS

This application is a U.S. National Stage Entry of International Patent Application Serial Number PCT/EP2015/076656, filed Nov. 16, 2015, which claims priority to German Patent Application No. DE 10 2015 100 496.8 filed Jan. 14, 2015, the entire contents of both of which are incorporated herein by reference.

FIELD

The present disclosure generally relates to welding electrodes and to devices and methods for resistance welding sandwich panels to other metallic components.

BACKGROUND

Through the use of sandwich sheets, which comprise a thermoplastic plastic layer between two thin metallic cover layers, the increasing demand for lightweight construction designs in the automotive industry can be satisfied, so as to further increase the weight saving potentials in motor vehicle design by using these sheets. Sandwich sheets can provide various advantageous, often mutually exclusive attributes opening up new weight saving potentials. Thus, thanks to the plastic layer the sandwich sheets have a much lower weight than solid sheets and at the same time they provide high strength values. Furthermore, the sandwich sheets are sound-proofing and provide a good stiffness.

However, one problem in the working of sandwich sheets is that they have an electrically insulating plastic layer, which causes problems during welding in regard to the formation of a flawless welded connection. Due to the unsuitability of the sandwich sheets for welding, such as for resistance welding or resistance spot welding to other metallic components, sandwich sheets are therefore often bonded or mechanically joined to each other.

In order to nevertheless make possible a welding of sandwich sheets, a method is known from German laid-open specification connection DE 10 2011 109 708 A1 for joining a sandwich sheet to another metallic component wherein the middle layer in the connection region is melted and displaced from the connection region, so that a welded connection can then be produced by making an electrical contact between the component and the cover layers of the sandwich sheet. It is proposed to perform the heating of the joint regions by temperature-controllable electrodes or pressing elements. For this, the welding electrodes or pressing elements are provided with heating elements, for example, which are actuated separately by a control system. The construction of the welding electrodes therefore becomes rather complex, since modifications to the welding electrode body and the welding electrode cap are necessary. Furthermore, it is desirable to further increase the rate of heating of the thermoplastic plastic layer, so that the shortest possible cycle times can be achieved.

Furthermore, from U.S. Pat. No. 4,650,951 there is known a method for resistance welding of two composite sheets, using two welding electrodes which are heated by heating elements arranged around the welding electrodes and which thus heat and displace the plastic layer situated between the cover layers before the actual welding begins. This results in relatively massive devices.

Therefore, a need exists for a welding electrode, a method and a device for resistance welding wherein efficient heating of the sandwich sheet to be welded can be achieved in a compact layout with the fewest possible modifications of the welding electrodes used heretofore.

DETAILED DESCRIPTION

Figure 1B:
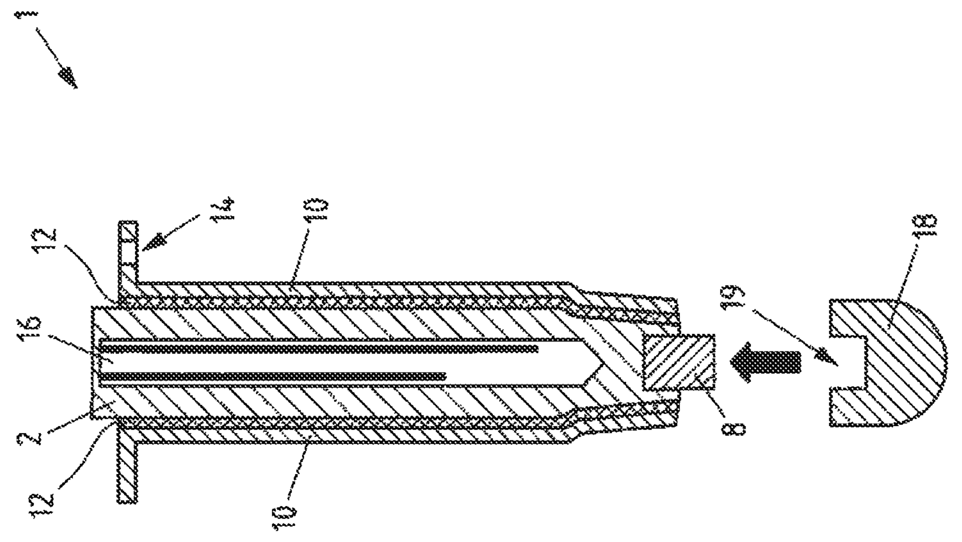
FIG. 1*b* is a schematic, longitudinal, sectional view of the example welding electrode of FIG. 1*a* with the welding electrode cap.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns a welding electrode comprising a welding electrode body and a welding electrode cap that is connected or connectable to the welding electrode body for making contact between the welding electrode and a component for producing a welded connection.

Furthermore, the present disclosure generally concerns a method for resistance welding a sandwich sheet (or panel) to at least one other metallic component, wherein the sandwich sheet comprises two metallic cover layers and a thermoplastic plastic layer arranged between the metallic cover layers. A region of the sandwich sheet to be welded may be heated such that the thermoplastic plastic layer softens and is displaced from the welding region by pressing together the cover layers. The cover layers may be welded together with the other component by a flow of electric current in a first circuit through a first welding electrode arranged on the side of the sandwich sheet and a second welding electrode arranged on the side of the other metallic component.

Still further, the present disclosure concerns a device for the resistance welding of a sandwich sheet, which may comprise a thermoplastic plastic layer arranged between metallic cover layers, to at least one other metallic component, with a first welding electrode disposable on the side of the sandwich sheet and with a second welding electrode disposable on the side of the other metallic component, with means of providing a first circuit which lead a welding current across at least the first and the second welding electrode, and with means for displacement of the plastic layer of the sandwich sheet from the region of the sandwich sheet to be welded.

Finally, the present disclosure also concerns performing the resistance welding with such a welding electrode or device.

The problem set forth above may be solved by a welding electrode where an electrically conductive resistance element integrated or which can be integrated in the welding electrode and which is connected or can be connected in electrically conductive manner to the welding electrode body and the welding electrode cap is provided for the heating of the component.

Thanks to the electrically conductive resistance element, electrical energy is transformed into heat by a flow of electric heating current (preheating current) through the electrically conductive resistance element. The production of heat occurs on the one hand by the transition resistance between the electrical resistance element and the welding electrode body and/or the welding electrode cap and on the other hand by the electrical resistance of the electrical resistance element itself. Thanks to this, the component which is making contact with the welding electrode cap to produce a welded connection can be heated in turn. If the component is a sandwich sheet, the thermoplastic plastic layer of the sandwich sheet can thus be softened in simple manner, for example, so that the cover sheets can be pressed together.

The sandwich sheet can then be welded to another component, such as another sheet, likewise making use of the welding electrode by means of a welding current flow (welding current). The welding current flow can occur across a first circuit and the heating current flow across a second circuit. The welding electrode may be part of both the first and the second circuit.

It is advantageous that a compact welding electrode can be provided by integration of the electrical resistance element in the welding electrode. For example, the resistance element can be designed especially easily as a block. At the same time, because the electrical resistance element is connected or can be connected in electrically conductive manner to the welding electrode body and the welding electrode cap, no separate actuation is required and the welding electrode only needs to be modified slightly for the integration of the electrical resistance element. Namely, a flow of electric current can be achieved through the resistance element across the welding electrode body and the welding electrode cap. For this, both the welding electrode body and the welding electrode cap may comprise electrically conductive material or be made from this. The resistance element may be connected or connectible directly or indirectly in electrically conductive manner to the welding electrode body and/or the welding electrode cap. Especially advantageously, the welding electrode is designed so that the welding electrode body is connected or can be connected in electrically conductive manner across, preferably solely across, the resistance element to the welding electrode cap. In this way, the entire current for heating can be conducted across the resistance element. A bypassing of the resistance element is avoided.

For the connecting of the welding electrode cap to the welding electrode body, this may be connected or be connectible for example in detachable fashion to the welding electrode body. For example, the welding electrode cap may be mounted on the welding electrode body. For this, the welding electrode body may for example at a first end be adapted to the welding electrode cap. The welding electrode body for example may comprise a substantially elongated extension with a first end for attachment of the welding electrode cap and a second end. In particular, the welding electrode body may be designed as a sleeve.

If according to one embodiment of the welding electrode the resistance element is integrated or integrable in the welding electrode in the region of the intended contacting of the welding electrode with the component to be welded, an especially efficient heat transfer can occur from the welding electrode to the component to be contacted. For example, the resistance element may be provided in the region of the welding electrode cap.

According to an especially preferred embodiment of the welding electrode, the resistance element is integrated or integrable in the welding electrode body. Preferably, the resistance element is arranged or can be arranged in the region of a first end of the welding electrode body that is provided for the connection to the welding electrode cap. For example, a seat is provided for the resistance element at the first end of the welding electrode body. Preferably, for a simple and space-saving integration, a seat can be provided in the form of a recess for the inserting of the resistance element in the welding electrode body. For example, the resistance element can be integrated in the welding electrode body in removable or non-removable manner.

The special advantage of this embodiment is that the use of standard welding electrode caps is made possible, since only a modification to the welding electrode body is required. Thus, the previously used welding electrode caps can continue to be used with no further modifications. As a result, the resistance element can be integrated especially easily in the welding electrode in the region of the contacting of the welding electrode with the component to be welded.

According to another especially preferred embodiment of the welding electrode, the resistance element is integrated or integrable in the welding electrode cap. For example, for a simple and space-saving integration, a seat can be provided in the form of a recess for the inserting of the resistance element in the welding electrode cap. For example, the resistance element can be integrated in the welding electrode cap in removable or non-removable manner.

As a result, the use of standard welding electrode bodies can be achieved thereby, since only a modification to the welding electrode cap is required. Thus, the previously used welding electrode bodies can continue to be used with no further modifications. As a result, the resistance element can be integrated especially easily in the welding electrode in the region of the contacting of the welding electrode with the component to be welded. Furthermore, in this case the resistance element can be advantageously swapped with the welding electrode cap.

It is especially advantageous in the two embodiments described above that the integration of the resistance element in the welding electrode body or in the welding electrode cap merely requires the adapting of either the welding electrode body or the welding electrode cap, but not the entire welding electrode.

According to another embodiment of the welding electrode, the welding electrode comprises at least a first material for conducting a welding current, where the electrical resistivity of the resistance element is greater than the electrical resistivity of the first material of the welding electrode for conducting the welding current. In this way, the production of heat can be concentrated at the resistance element, so that a targeted input of heat can occur at the component to be contacted.

According to another embodiment of the welding electrode, the welding electrode body and/or the welding electrode cap consist at least partly of the first material for conducting the welding current, while the first material is preferably a metal, especially copper or a copper alloy. In this way, the construction of the welding electrode body or the welding electrode cap can be kept simple and furthermore a good electrical conductivity can be achieved, causing no unnecessary generating of heat.

According to another embodiment of the welding electrode, the welding electrode comprises an electrically conductive welding electrode jacketing, at least partly surrounding the welding electrode body and electrically insulated from the welding electrode body. In this way, both the introduction of the current and the return of the current for a current flow for the heating can be realized in compact manner through the welding electrode.

Especially advantageously, the electrically conductive welding electrode jacketing is designed for the attachment of a current return. For example, the welding electrode jacketing comprises a connection region for a conductor.

According to another embodiment of the welding electrode, the electrically conductive welding electrode jacketing consists at least partly of a metal, especially of copper or a copper alloy, such as brass. In this way, a good electrical conductivity of the welding electrode jacketing is achieved. This can reduce or prevent an unwanted generating of heat along the welding electrode body.

According to another embodiment of the welding electrode, the welding electrode comprises between the electrically conductive welding electrode jacketing and the welding electrode body an electrical insulation at least partly surrounding the welding electrode body. This may likewise be provided, for example, as a jacketing arranged between the electrically conductive welding electrode jacketing and the welding electrode body. Thanks to the electrical insulation, an unwanted current flow between the welding electrode body and the electrically conductive welding electrode jacketing can be achieved in simple manner. Thus, a preheating current flow can be taken to and also away from the resistance element across the welding electrode.

According to another embodiment, the welding electrode is designed so that the welding electrode body is connected or connectible in electrically conductive manner to the welding electrode jacketing across the resistance element and the welding electrode cap. Preferably, the welding electrode body is connected or connectible in electrically conductive manner to the welding electrode jacketing solely across the resistance element and the welding electrode cap. In this way, the preheating current can be conducted in simple manner by the resistance element and taken to and from it by means of the welding electrode body and the welding electrode jacketing. Thus, as a result, a minimum of components and modifications is necessary in order to lead the preheating current across the resistance element.

According to another embodiment of the welding electrode, the resistance element consists at least partly of metal and the electrical resistivity of the resistance element is preferably larger than the electrical resistivity of copper, for example. With a resistance element of metal, this can be easily integrated in electrically conductive manner into the welding electrode. Furthermore, it has been shown that, for an efficient generating of heat, an electrical resistivity greater than that of copper, for example, preferably one significantly greater, is advantageous. Especially preferably, the electrical resistance element comprises tungsten or is made of tungsten. Basically, however, other metals with a higher electrical resistivity than copper, for example, are also conceivable.

According to another embodiment of the welding electrode, the welding electrode body comprises cooling channels for the cooling of the welding electrode. In this way, a cooling of the welding electrode body and thus the welding electrode can be accomplished, so that a too intense heating by the current flow through the resistance element can be avoided.

According to a second teaching of the present invention, the above-mentioned problem is solved in a method of this kind for the resistance welding of a sandwich sheet to at least one other metallic component in that the first welding electrode is a welding electrode according to the invention and the region of the sandwich sheet to be welded is heated by a current flow in a second circuit, which comprises the welding electrode body, the resistance element and the welding electrode cap of the first welding electrode.

It has been found that, when using a welding electrode according to the invention in a second circuit which comprises the welding electrode body, the electrical resistance element and the welding electrode cap of the first welding electrode, a heating of the welding region can be achieved in easy manner with a compact layout. Thanks to the electrical resistance, the heating of the welding region can be done by the electrical resistance element without requiring additional current bridges at the components to be welded together, for example. As already discussed, the production of heat occurs on the one hand through the transition resistance between the electrical resistance element and the welding electrode body and/or the welding electrode cap and on the other hand by the electrical resistance of the electrical resistance element itself.

The second welding electrode can be constructed similar to the first welding electrode, for example, comprising a welding electrode body and a welding electrode cap, for example. In contrast with the first welding electrode, however, the second welding electrode preferably comprises no electrical resistance element for the generating of heat.

If the electrical resistance element is integrated for example in the welding electrode body of the first welding electrode, the same welding electrode caps can advantageously be used for the first and the second welding electrode. If the electrical resistance element is integrated for example in the welding electrode cap of the first welding electrode, advantageously the same welding electrode bodies can be used for the first and the second welding electrode.

According to one embodiment of the method according to the invention, the welding current flow in the first circuit occurs across the welding electrode body, the resistance element and the welding electrode cap of the first welding electrode, the sandwich sheet, the other metallic component, and the second welding electrode which is in contact with the other metallic component. Thus, the electrical resistance element does not necessarily have to be removed again during the welding.

According to another embodiment of the method according to the invention, the heating current flow in the second circuit occurs across the welding electrode body, the resistance element, the welding electrode cap and the electrically conductive welding electrode jacketing of the first welding electrode and a secondary connecting conductor attached to it. Thus, in particular, the second circuit does not include the sandwich sheet and/or the other metallic component.

According to a third teaching of the present invention, the above-mentioned problem is solved in a device of this kind for the resistance welding of a sandwich sheet in that the first welding electrode is a welding electrode according to the invention and a second circuit is provided, wherein the second circuit comprises the welding electrode body, the resistance element and the welding electrode cap of the first welding electrode, so that the region of the sandwich sheet to be welded can be heated by a current flow in the second circuit.

Regarding other advantageous embodiments of the device, reference is made to the description of the embodiments of the welding electrode and the method and benefits thereof.

The description of steps of the method according to preferred embodiments of the method according to the invention will also disclose corresponding means of carrying out the steps of the method by preferred embodiments of the device according to the invention. Likewise, the disclosure of means to carry out a step of the method will disclose the corresponding step of the method.

According to a fourth teaching of the present invention, the abovementioned problem is solved by the use of a welding electrode according to the invention or a device according to the invention for the resistance welding, especially resistance spot welding, of a sandwich sheet, which comprises a thermoplastic plastic layer arranged between metallic cover layers, to at least one other metallic component.

Figure 1A:
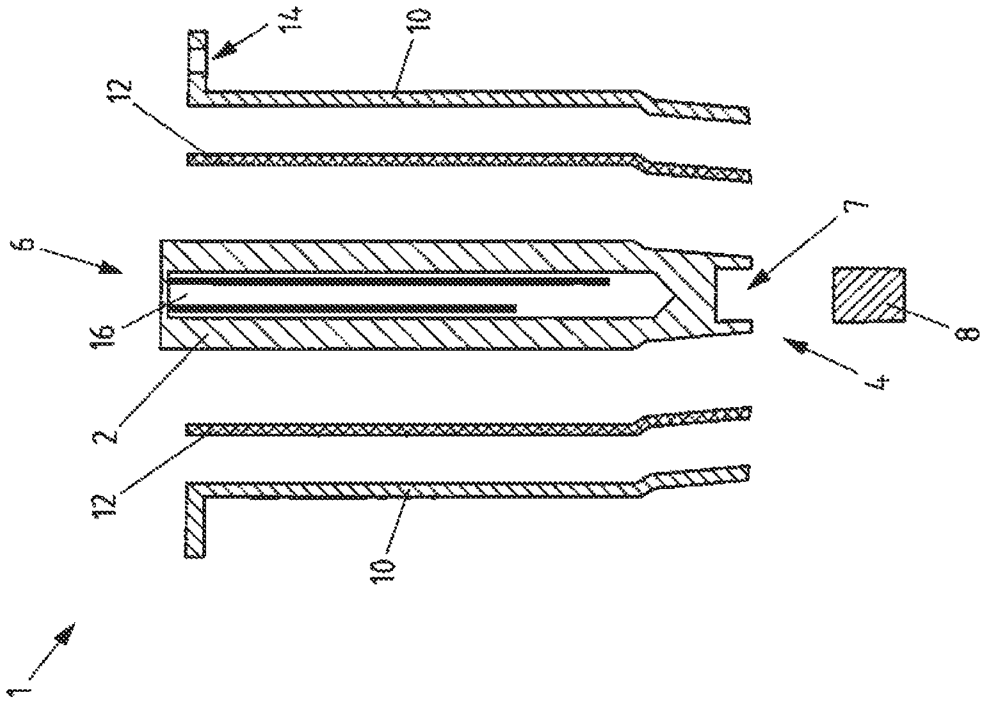
FIG. 1*a* is a schematic, longitudinal, sectional, exploded view of an example welding electrode without a welding electrode cap.

FIG. 1*a* first of all shows in longitudinal section a schematic exploded representation of a first exemplary embodiment of a welding electrode according to the invention without the welding electrode cap. The welding electrode 1 comprises a welding electrode body 2. This is designed as a sleeve, substantially elongated, with a first end 4 and a second end 6. At its first end 4 the welding electrode body 2 comprises a recess 7 for receiving an electrically conductive resistance element 8. The resistance element 8 and the seat 7 are adapted to each other, so that the resistance element 8 can be integrated in the welding electrode body 2 and connected in electrically conductive manner to the welding electrode body 2.

The welding electrode body 2 in this case is made from a first material, a copper alloy, for conducting a welding current. The resistance element 8 is made of tungsten and comprises an electrical resistivity which is thus greater than the first material of the welding electrode body 2. Thus, the resistance element 8 comprises a greater electrical resistivity than that of copper.

The welding electrode 1 furthermore comprises an electrically conductive welding electrode jacketing 10, at least partly surrounding the welding electrode body 2 and electrically insulated from the welding electrode body 2. The electrically conductive welding electrode jacketing 10 consists of metal, in this case, of a copper alloy such as brass. For the insulation, the welding electrode 1 comprises between the electrically conductive welding electrode jacketing 10 and the welding electrode body 2 an electrical insulation 12 at least partly surrounding the welding electrode body 2. The welding electrode jacketing 10 furthermore comprises a connection region 14 in the region of the second end 6 of the welding electrode body 2 for attachment of a current return.

For the cooling of the welding electrode 1, the welding electrode body 2 comprises cooling channels 16, which substantially extend from the second end 6 to the first end 4 along the length of the welding electrode body 2.

FIG. 1*b* shows in longitudinal section a schematic representation of the first exemplary embodiment of a welding electrode from FIG. 1, also representing a welding electrode cap 18. The welding electrode cap 18 like the welding electrode body likewise consists of the first material for conducting the welding current, in this case a copper alloy. The welding electrode cap 18 is designed for making contact with a component to be welded. Because the welding electrode body 2 is adapted to the resistance element 8 and the resistance element 8 is integrated in the welding electrode body 2, the welding electrode body 2 with the resistance element 8 for the welding electrode cap 18 behaves like a standard welding electrode body. In this way, it is possible to use a welding electrode cap 18 which does not need to be modified, despite the integration of the resistance element 8 in the welding electrode 1. Instead, the welding electrode cap 18 can be mounted as usual on the welding electrode body 2 in the direction of the arrow. For this, the welding electrode cap 18 comprises a recess 19, in which the welding electrode body 2 can be introduced by its first end 4 with the resistance element 8.

The welding electrode cap 18 is designed so that it can be connected in electrically conductive manner to the resistance element 8 integrated in the welding electrode body 2 and the welding electrode jacketing 10.

Figure 2B:
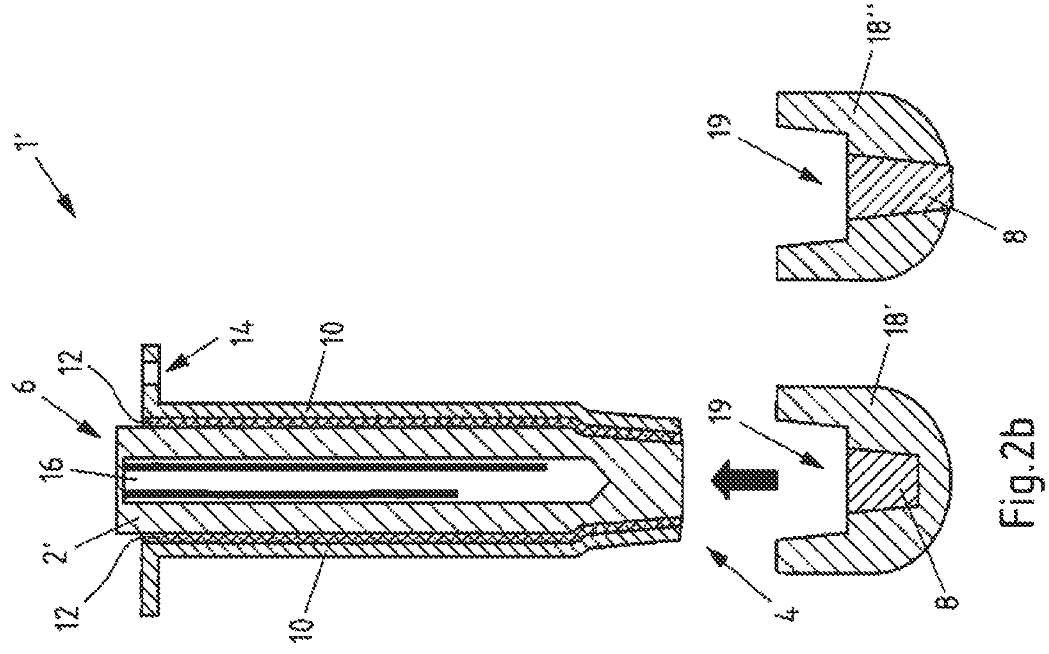
FIG. 2*b* is a schematic, longitudinal, sectional view of the welding electrode of FIG. 2*a* with the welding electrode cap.
Figure 2A:
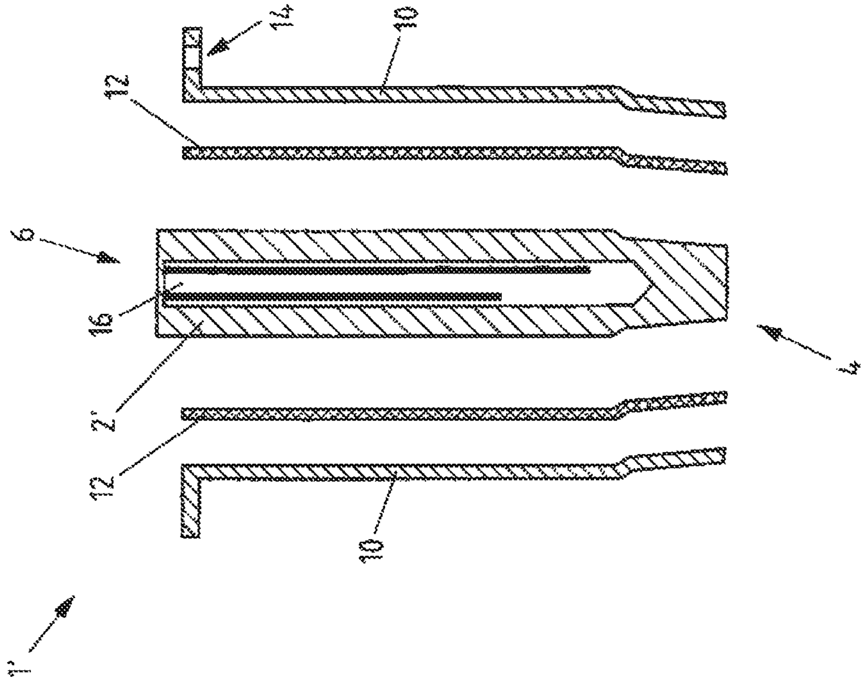
FIG. 2*a* is a schematic, exploded view of another example welding electrode without a welding electrode cap.

FIG. 2*a* shows in longitudinal section a schematic exploded representation of a second exemplary embodiment of a welding electrode 1' according to the invention without the welding electrode cap. The welding electrode 1' here is designed similar to the welding electrode 1. Accordingly, reference is made to the description of the welding electrode 1. In contrast to the welding electrode 1, however, the welding electrode 1' comprises no resistance element.

As shown in FIG. 2*b*, the resistance element 8 is integrated in the welding electrode cap 18'. FIG. 2*b* shows in longitudinal section a schematic representation of the second exemplary embodiment of a welding electrode 1' including the welding electrode cap 18'. Like the first welding electrode cap 18, the welding electrode cap 18' apart from the resistance element 8 consists of a copper alloy. The resistance element 8, in turn, consists of tungsten, a material with higher electrical resistivity. Because the welding electrode cap 18' is adapted to the resistance element 8 and the resistance element 8 is integrated in the welding electrode cap 18', the welding electrode cap 18' with the resistance element 8 for the welding electrode body 2' behaves like a standard welding electrode cap. In this way, a welding electrode body 2' can be used which despite the integration of the resistance element in the welding electrode 1' does not need to be modified. Instead, the welding electrode cap 18' can be mounted as usual on the welding electrode body 2'.

Like the welding electrode cap 18, the welding electrode cap 18' is designed so that it can be connected in electrically conductive manner to the welding electrode body 2 and the welding electrode jacketing 10.

Furthermore, FIG. 2*b* shows another exemplary embodiment of a welding electrode cap 18". The resistance element 8 here is integrated in the welding electrode cap 18" such that the resistance element 8 can make contact with the component to be welded.

Figure 3:
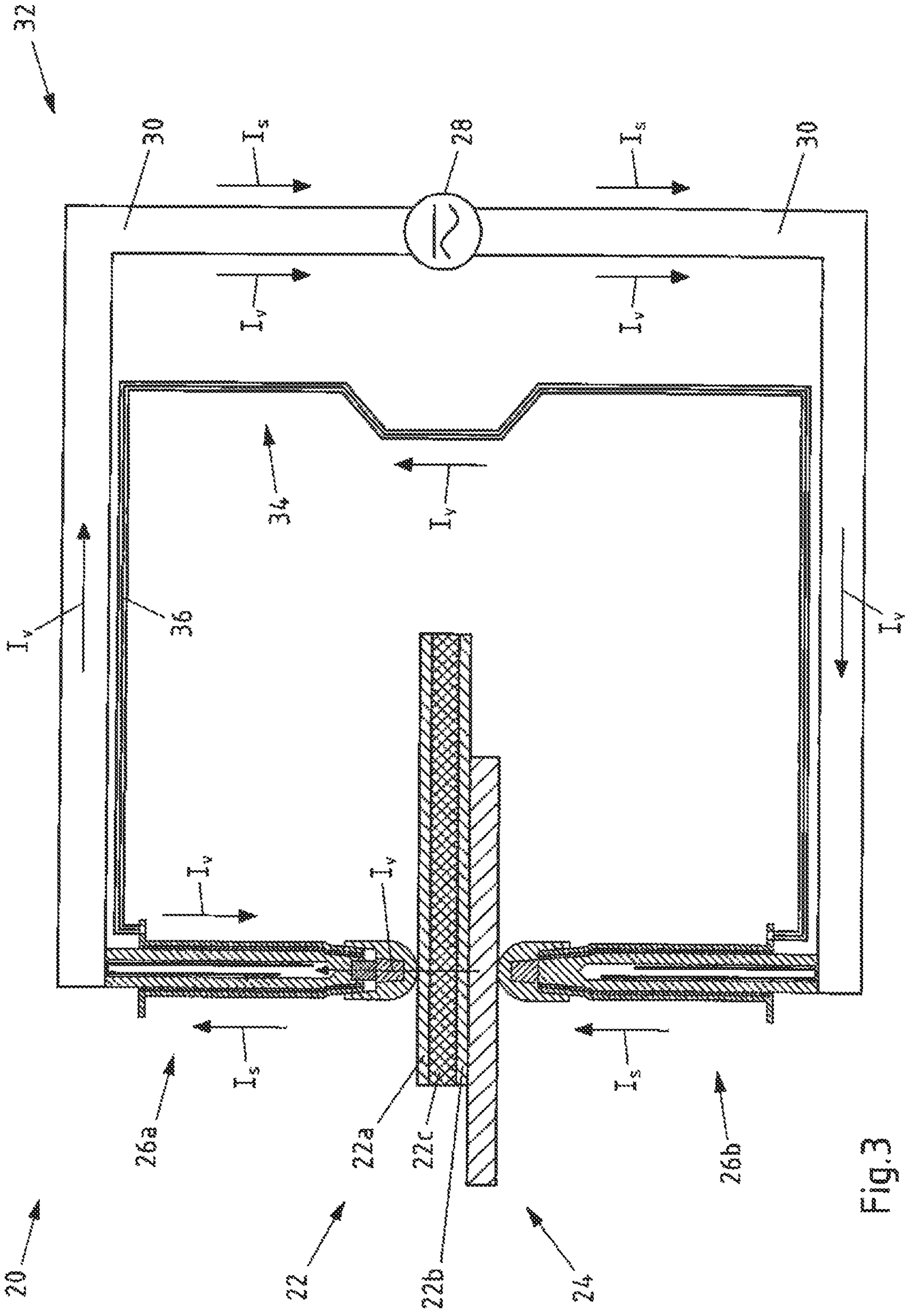
FIG. 3 is a schematic view of an example device for performing an example method of welding.

FIG. 3 shows a schematic representation of an exemplary embodiment of a device 20 according to the invention for carrying out an exemplary embodiment of a method according to the invention.

Here, for example, the welding electrodes 1, 1' shown in FIGS. 1 and 2 can be used. The device 20 is designed for the resistance welding of a sandwich sheet 22 to at least one other metallic component 24. The sandwich sheet 22 comprises a thermoplastic plastic layer 22*c* arranged between metallic cover layers made preferably of steel 22*a*, 22*b*. The other component 24 is likewise fashioned as a metal sheet, such as a steel sheet. The device 20 comprises a first welding electrode 26*a* arranged on the side of the sandwich sheet 22 and a second welding electrode 26*b* arranged on the side of the other metallic component 24. As the first welding electrode 26*a*, an exemplary embodiment of a welding electrode according to the invention is used, such as one of the welding electrodes 1 or 1' as shown in FIG. 1 or FIG. 2. For the second welding electrode 26*b*, likewise a welding electrode as shown in FIG. 1 or 2 can be used, but the second welding electrode does not need to comprise any electrically conductive resistance element.

Furthermore, the device 20 comprises with a current source 28 and electrical conductors 30 means of providing a first circuit 32, which lead a welding current $I_S$ at least across the first welding electrode 26*a* and the second welding electrode 26*b*. The first circuit 32 comprises the current source 28, the electrical conductors 30, the first welding electrode 26*a*, the sandwich sheet 22, the other component 24 and the second welding electrode 26*b*. Furthermore, the device 20 with the first welding electrode 26*a* comprises means of displacing the plastic layer 22*c* of the sandwich sheet 22 from the region of the sandwich sheet 22 to be welded.

Furthermore, a second circuit 34 is provided for conducting a preheating current $I_V$. The second circuit 34 comprises the current source 28, the electrical conductors 30, the first welding electrode 26*a*, the electrical conductors 36 and the second welding electrode 26*b*. In regard to the first welding electrode 26*a*, the second circuit 34 comprises the welding electrode body, the resistance element, the welding electrode cap and the welding electrode jacketing of the first welding electrode 26*a* (also see FIG. 4), so that the region of the sandwich sheet 22 to be welded can be heated by a current flow in the second circuit 34. Alternatively, it is conceivable for the second circuit 34 to also return directly to the current source 28 for example from the first welding electrode 26*a* by means of the electrical conductors 36 without using the second welding electrode 26*b*.

With the device 20, a method for the resistance welding of the sandwich sheet 22 to the other metallic component 24 can be carried out. In the method, the region of the sandwich sheet 22 to be welded is heated such that the thermoplastic plastic layer 22*c* softens and is displaced from the welding region by pressing together the cover layers 22*a*, 22*b*. For this, means of applying force to the welding electrodes can be provided, such as welding tongs. The region of the sandwich sheet 22 to be welded is heated by a preheating current flow $I_V$ in the second circuit 34. As already represented, the second circuit 34 comprises the welding electrode body, the resistance element, the welding electrode cap and the welding electrode jacketing of the first welding electrode 26*a*. Thanks to the electrical resistivity of the resistance element, the current flow through the resistance element can heat the first welding electrode 26*a* and thus the region of the sandwich sheet 22 to be welded, so that the thermoplastic plastic layer 22*c* softens and can be displaced.

Now, since an electrically conductive connection exists between the welding electrodes 26*a*, 26*b* across the components 22, 24, the cover layers 22*a*, 22*b* can afterwards be welded to each other with the other component 24 by an electrical welding current flow $I_S$ in the first circuit 32 across the first welding electrode 26*a* and the second welding electrode 26*b*.

Figure 4B:
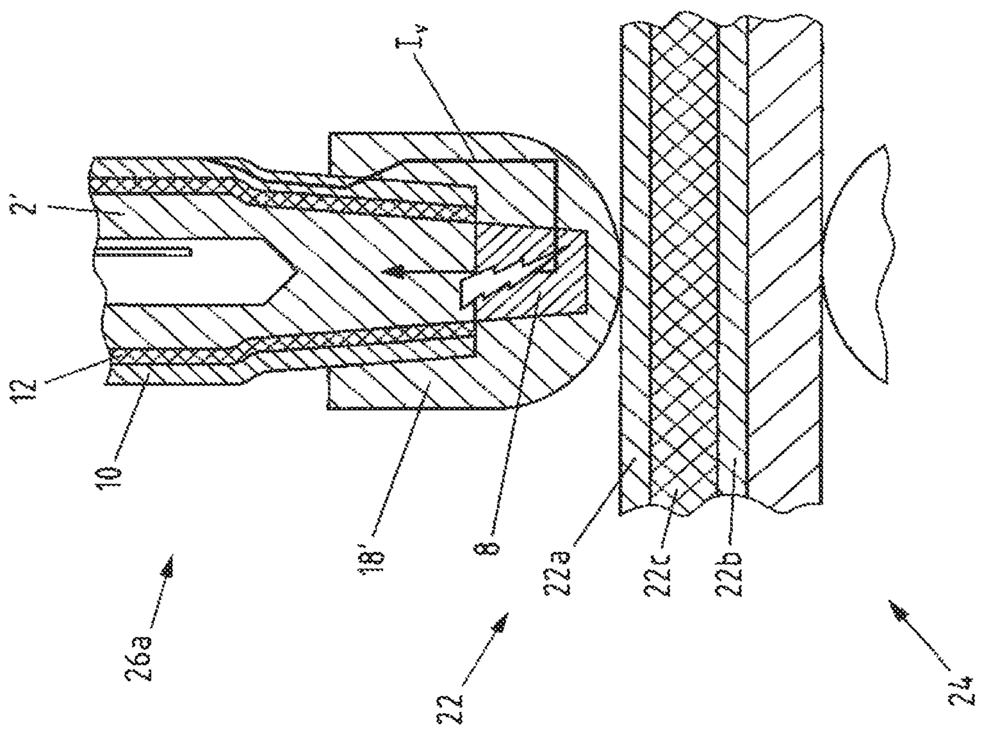
FIG. 4*b* is a detail view of a region to be welded by way of the example welding electrode of FIG. 2.
Figure 4A:
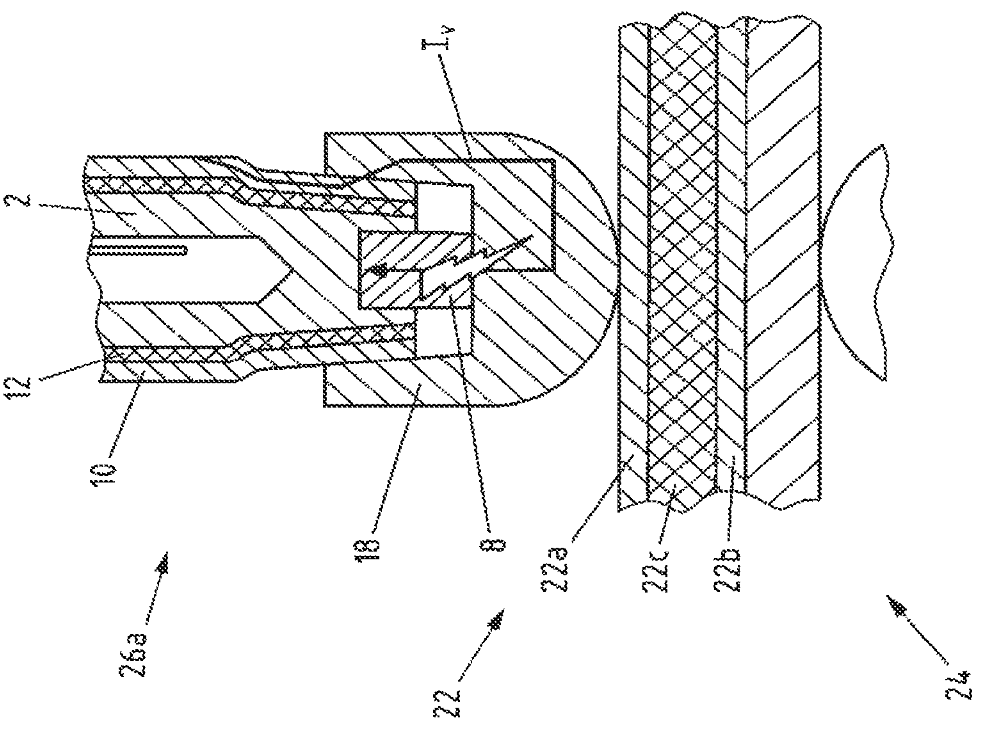
FIG. 4*a* is a detail view of a region to be welded by way of the example welding electrode of FIG. 1.

FIG. 4*a* shows a magnified view of the region to be welded making use of the welding electrode 1 from FIG. 1. The preheating current $I_V$ flows in the second circuit 34 across the electrical conductor 36 and the connection region 14 of the welding electrode jacketing 10. Thanks to the contacting of the welding electrode cap 18 with the welding electrode jacketing 10, furthermore the preheating current $I_V$ flows across the welding electrode cap 18, the resistance element 8 integrated in the welding electrode body and the welding electrode body 2. The increased electrical resistance of the resistance element 8 and the transition resistance between the resistance element 8 and the welding electrode cap 18 or the welding electrode body 2 produces the necessary heat to locally heat the plastic layer 22*c*.

FIG. 4*b* shows a magnified view of the region to be welded making use of the welding electrode 1' from FIG. 2. Here as well, the resistance element 8, being integrated here in the welding electrode cap 18', is connected on the one hand across the welding electrode cap 18', the welding electrode jacketing 10, the connection region 14 and the electrical conductor 36 and on the other hand across the welding electrode body 2' and the electrical conductor 30 to the current source 28. In this case as well, the increased electrical resistance of the resistance element 8 and the transition resistance between the resistance element 8 and the welding electrode cap 18' or the welding electrode body 2' produces the necessary heat to locally heat the plastic layer 22*c*.

What is claimed is:

1. A welding electrode comprising:

a welding electrode body;

a welding electrode cap connectable to the welding electrode body and configured to make contact with a component to produce a welded connection;

an electrically conductive welding electrode jacketing that at least partly surrounds the welding electrode body; and an electrically conductive resistance element for heating the component;

wherein:

the electrically conductive resistance element is configured to be integrated in the welding electrode;

the electrically conductive resistance element is in contact with both the welding electrode body and the welding electrode cap when the welding electrode cap is connected to the electrode body;

the welding electrode body is connected or connectable in an electrically conductive manner to the welding electrode jacketing across the electrically conductive resistance element and the welding electrode cap; and the electrically conductive resistance element is connectable in an electrically conductive manner to the welding electrode body and the welding electrode cap.

2. The welding electrode of claim 1 wherein the electrically conductive resistance element is configured to be integrated in the welding electrode in a region intended to contact the component.

3. The welding electrode of claim 1 wherein the electrically conductive resistance element is configured to be integrated in the welding electrode body.

4. The welding electrode of claim 1 wherein the electrically conductive resistance element is configured to be integrated in the welding electrode cap.

5. The welding electrode of claim 1 further comprising a first material for conducting a welding current, wherein an electrical resistivity of the electrically conductive resistance element is greater than an electrical resistivity of the first material for conducting the welding current.

6. The welding electrode of claim 5 wherein at least one of the welding electrode body or the welding electrode cap comprise the first material for conducting the welding current.

7. The welding electrode of claim 6 wherein the first material is copper or a copper alloy.

8. The welding electrode of claim 1 wherein the electrically conductive welding electrode jacketing is comprised of metal.

9. The welding electrode of claim 1 wherein the electrically conductive welding electrode jacketing is comprised of copper or a copper alloy.

10. The welding electrode of claim 1 further comprising an electrical insulation that at least partly surrounds the welding electrode body, wherein the electrical insulation is disposed between the electrically conductive welding electrode jacketing and the welding electrode body.

11. The welding electrode of claim 1 wherein the electrically conductive resistance element comprises metal, wherein an electrical resistivity of the electrically conductive resistance element is larger than an electrical resistivity of copper.

12. The welding electrode of claim 1 wherein the welding electrode body comprises cooling channels for cooling the welding electrode.

13. A method for resistance welding a metallic component to a sandwich sheet that comprises a thermoplastic layer disposed between two metallic cover layers, the method comprising:

heating a region of the sandwich sheet to be welded such that the thermoplastic layer softens;

displacing the softened thermoplastic layer in the region by pressing together the two metallic cover layers; and welding the two metallic cover layers and the metallic component together by a flow of electric current in a first circuit through a first welding electrode disposed on a side of the sandwich sheet and a second welding electrode disposed on a side of the metallic component, wherein:

the first welding electrode comprises a welding electrode body, a welding electrode cap connectable to the welding electrode body and configured to make contact with the metallic component to produce a welded connection, an electrically conductive welding electrode jacketing that at least partly surrounds the welding electrode body, and an electrically conductive resistance element for heating the metallic component, wherein the welding electrode body is connected or connectable in an electrically conductive manner to the welding electrode jacketing across the electrically conductive resistance element and the welding electrode cap;

the electrically conductive resistance element is configured to be integrated in the first welding electrode;

the electrically conductive resistance element is connected or connectable in an electrically conductive manner to the welding electrode body and the welding electrode cap; and heating the region of the sandwich sheet to be welded is performed by way of a current flow in a second circuit comprising the welding electrode body, the electrically conductive resistance element, and the welding electrode cap of the first welding electrode.

14. A device for resistance welding a metallic component to a sandwich sheet that comprises a thermoplastic layer disposed between metallic cover layers, the device comprising:

a first welding electrode positionable on a side of the sandwich sheet, wherein the first welding electrode comprises a welding electrode body, a welding electrode cap connectable to the welding electrode body and configured to make contact with the metallic component to produce a welded connection, an electrically conductive welding electrode jacketing that at least partly surrounds the welding electrode body, and an electrically conductive resistance element for heating the metallic component, wherein the electrically conductive resistance element is configured to be integrated in the first welding electrode, wherein the electrically conductive resistance element is connected or connectable in an electrically conductive manner to the welding electrode body and the welding electrode cap, wherein the welding electrode body is connected or connectable in an electrically conductive manner to the welding electrode jacketing across the electrically conductive resistance element and the welding electrode cap;

a second welding electrode positionable on a side of the metallic component;

a first circuit configured to pass a welding current across the first and second welding electrodes; and means for displacing the thermoplastic layer of the sandwich sheet from a region of the sandwich sheet to be welded, wherein a second circuit comprises the welding electrode body, the electrically conductive resistance element, and the welding electrode cap of the first welding electrode, wherein the region of the sandwich sheet to be welded can be heated by passing current through the second circuit.

* * * * *